(12) United States Patent
Park et al.

(10) Patent No.: US 10,900,845 B2
(45) Date of Patent: Jan. 26, 2021

(54) PRINTED MATERIAL FOR TEMPERATURE SENSING DISPLAY PACKAGE AND PACKAGING MATERIAL USING THE SAME

(71) Applicant: CJ Cheiljedang Corporation, Seoul (KR)

(72) Inventors: Eun Jin Park, Seoul (KR); Sung Joo Lee, Gyeonggi-do (KR)

(73) Assignee: CI Cheiljedang Corporation, Seoul (KR)

( * ) Notice: Subject to any disclaimer, the term of this patent is extended or adjusted under 35 U.S.C. 154(b) by 292 days.

(21) Appl. No.: 15/769,304

(22) PCT Filed: Oct. 19, 2016

(86) PCT No.: PCT/KR2016/011747
§ 371 (c)(1),
(2) Date: Apr. 18, 2018

(87) PCT Pub. No.: WO2017/069511
PCT Pub. Date: Apr. 27, 2017

(65) Prior Publication Data
US 2018/0306648 A1    Oct. 25, 2018

(30) Foreign Application Priority Data

Oct. 22, 2015  (KR) .......................... 10-2015-0147352

(51) Int. Cl.
*G01K 11/12* (2006.01)
*B65D 65/38* (2006.01)
(Continued)

(52) U.S. Cl.
CPC .............. *G01K 11/12* (2013.01); *B65D 65/38* (2013.01); *C09D 11/50* (2013.01); *G01K 11/16* (2013.01);
(Continued)

(58) Field of Classification Search
CPC ........ G01K 11/12; G01K 11/16; B65D 65/38; B65D 2203/12; C09D 11/50; G09F 3/00; G09F 3/02
See application file for complete search history.

(56) References Cited

U.S. PATENT DOCUMENTS

| 4,554,565 A * | 11/1985 | Kito ...................... B41M 5/284 374/E11.018 |
| 5,202,677 A * | 4/1993 | Parker .................. G02F 1/0147 349/161 |

(Continued)

FOREIGN PATENT DOCUMENTS

| CN | 101016039 A | 8/2007 |
| CN | 201508253 U | 6/2010 |

(Continued)

OTHER PUBLICATIONS

International Application Status Report, International Patent Application No. PCT/KR2016/011747, dated Mar. 31, 2017; 2 pages.
(Continued)

*Primary Examiner* — Nathaniel T Woodward
*Assistant Examiner* — Philip L Cotey
(74) *Attorney, Agent, or Firm* — Adsero IP

(57) ABSTRACT

The purpose of the present invention is to display a printing layer expressed in various colors through the property of a temperature display ink layer turning transparent at high temperature of 60° C. or above, by forming the printing layer expressed with various colors on a printed film, and the temperature display ink layer on the top of the printing layer. To achieve the purpose, the present invention includes the printed film, the printing layer formed on the top of the printed film, and the temperature display ink layer formed on the top of the printing layer.

10 Claims, 2 Drawing Sheets

(51) Int. Cl.
*G09F 3/00* (2006.01)
*G01K 11/16* (2006.01)
*C09D 11/50* (2014.01)
*G09F 3/02* (2006.01)

(52) U.S. Cl.
CPC .................. *G09F 3/00* (2013.01); *G09F 3/02* (2013.01); *B65D 2203/12* (2013.01)

(56) References Cited

U.S. PATENT DOCUMENTS

| | | | | |
|---|---|---|---|---|
| 8,569,208 | B1* | 10/2013 | Ribi | G01N 31/229 503/216 |
| 8,722,575 | B2 | 5/2014 | Masciambruni | |
| 2003/0231234 | A1* | 12/2003 | Ushirogouchi | C09D 11/38 347/100 |
| 2004/0142070 | A1* | 7/2004 | Haen | G01K 3/005 426/87 |
| 2006/0274135 | A1* | 12/2006 | Ushirogouchi | C08G 65/14 347/96 |
| 2007/0171506 | A1* | 7/2007 | Jordan | C09D 11/50 359/288 |
| 2008/0050540 | A1* | 2/2008 | Christofer | B44F 1/06 428/13 |
| 2008/0090029 | A1* | 4/2008 | Hoshino | B42D 25/364 428/29 |
| 2010/0264640 | A1* | 10/2010 | Lane | B42D 25/47 283/67 |
| 2010/0285180 | A1* | 11/2010 | Gaylor | B65B 51/225 426/88 |
| 2011/0253577 | A1 | 10/2011 | Masciambruni | |
| 2012/0104743 | A1* | 5/2012 | Mehta | C09D 11/50 283/95 |
| 2014/0106963 | A1* | 4/2014 | Ribi | G01N 31/229 503/216 |
| 2014/0210201 | A1* | 7/2014 | Owen | G09F 3/0291 283/94 |
| 2014/0221528 | A1* | 8/2014 | Ribi | G01K 11/12 523/351 |
| 2016/0194132 | A1* | 7/2016 | Davidson | B65D 1/0207 700/213 |

FOREIGN PATENT DOCUMENTS

| | | |
|---|---|---|
| CN | 102803095 A | 11/2012 |
| CN | 203148278 U | 8/2013 |
| CN | 103496262 A | 1/2014 |
| CN | 204269256 U | 4/2015 |
| KR | 20-0293127 | 10/2002 |
| KR | 20-0425080 | 9/2006 |
| KR | 20-2010-0010276 | 10/2010 |
| KR | 20-2011-0003799 | 4/2011 |
| KR | 20-2011-0011589 | 12/2011 |

OTHER PUBLICATIONS

RU Office Action, dated Oct. 18, 2018, (RU Application No. 2018118561) 6 pages, including English translation.
RU Search Report, dated Oct. 17, 2018, (RU Application No. 2018118561) 2 pages.
Chinese Office Action, Chinese Application No. 201680062057.1, dated Aug. 30, 2019, 8 pages. No English Translation available.
Chinese Office Action, Chinese Application No. 201680062057.1, dated Nov. 12, 2020, 18 pages. With English Translation attached.

* cited by examiner

PRINTED MATERIAL FOR TEMPERATURE SENSING DISPLAY PACKAGE AND PACKAGING MATERIAL USING THE SAME

RELATED APPLICATIONS

This application is a 35 U.S.C. § 371 national phase application of International Application No. PCT/KR2016/011747 (WO2017-069511 A1), filed on Oct. 19, 2016, entitled "Printed Material for Temperature Sensing Display Package and Packaging Material Using the Same", which application claims the benefit of Korean Application No. 10-2015-0147352, filed on Oct. 22, 2015, which is incorporated herein by reference in its entirety.

TECHNICAL FIELD

The present invention relates to a printed material for temperature sensing display package and a packaging material using the same, and more particularly to a printed material for temperature sensing display package and a packaging material using the same that uses a double print forming a temperature display ink layer on the top of a printing layer to realize a variety of color changes when high temperatures increase or decrease.

BACKGROUND ART

Thermochromic ink, also called thermometric dye or thermocolor, is a type of ink that changes color at a certain temperature change point.

There are two different categories of thermochromic inks: reversible inks and irreversible inks. The reversible ink changes color with an increase in the temperature and turns to the original color once the temperature is reduced below a certain temperature. The irreversible ink changes color only with an increase in the temperature and remains unchanged in color at a certain temperature. A combination of different reversible thermochromic inks makes it possible to realize a variety of color changes as the temperature increases, so it is widely applied to mood rings or baby bottles that change color at a certain temperature acceptable for drinking.

The thermochromic inks are normally in the form of liquid crystals or leuco dyes. Liquid crystals are controllable to work with a specific temperature but mostly limited in the range of color change. Leuco dyes take the wider range of color change than liquid crystals, but they are hard to control in color change exactly with a temperature change.

The thermochromic inks are currently put into a wide range of applications, such as disposal cups, lids, or the like. They are printed using offset printing as lithography, transforming master batch, flexography as block printing, roto-gravure printing in the form of an engraving printing that is a special printing on other substrates than paper, sealing printing, and so forth.

A sort of protective film is used in order to protect the thermochromic inks, which are very sensitive to the environments. A known technique is protecting the thermochromic inks with microcapsules a few to hundreds of micrometers (μm) in size to encapsulate or cover the ink substance.

The thermochromic micro capsules according to the prior art have a maximum color change point of 60° C. that allows the acceptable temperature range of thermochromic inks available for use in the refrigerated products between 0 and 15° C. and in the products using hot water between 20 and 40° C.

The color substantially available for the thermochromic micro capsules used in the products at 40° C. or above is limited to black or magenta, and the thermochromic micro capsules have difficulty in realizing graphic designs.

Moreover, the thermochromic micro capsules tend to break due to frictions with the doctor blade (a blade to control the quantity of ink in the ink rollers) and the guide during roto-gravure printing or flexo printing, so they are hard to apply to the roto-gravure printing or the like.

The prior documents using thermochromic inks in relation to the present invention include KR Laid-Open Publication No. 20-2014-0003749 (laid-open on Jun. 19, 2014), KR Patent No. 10-0342907 (publicized on Jul. 4, 2002), KR Patent No. 10-1353533 (publicized on Feb. 17, 2014), KR Patent No. 10-0914793 (publicized on Sep. 2, 2009), KR Utility Model No. 20-0468302 (publicized on Aug. 12, 2013), and KR Patent No. 10-1294224 (publicized on Aug. 7, 2013). But, the technologies in the prior art problematically have the difficulty in realizing a variety of color changes with a change of high temperature.

RELATED ART DOCUMENT (Patent Document 1) KR 20-2014-0003749 U (laid-open on Jun. 19, 2014)

(Patent Document 2) KR 10-0342907 B1 (publicized on Jul. 4, 2002)

(Patent Document 3) KR 10-1363633 B1 (publicized on Feb. 17, 2014)

(Patent Document 4) KR 10-0914793 B1 (publicized on Sep. 2, 2009)

(Patent Document 5) KR 10-0468302 Y1 (publicized on Aug. 12, 2013)

(Patent Document 6) KR 10-1294224 B1 (publicized on Aug. 7, 2013)

DISCLOSURE OF INVENTION

The present invention is contrived to solve the problems with the prior art. It is therefore an object of the present invention to provide a printed material for temperature sensing display package and a packaging material using the same that includes a printing layer having a print in different colors as formed on a printed film and a temperature display ink layer formed on the printing layer to display the printing layer in different colors using the property of the temperature display ink layer turning transparent at high temperature of 60° C. or above.

It is another object of the present invention to provide a printed material for temperature sensing display package and a packaging material using the same that increases the esthetic feature of the product with the expression of various colors to promote the marketable quality.

To achieve the objects of the present invention, there is provided a printed material for temperature sensing display package that includes: a printed film; a printing layer formed on the top of the printed film using a printing ink or a thermochromic ink; and a temperature display ink layer formed on the top of the printing layer.

Preferably, the printing layer may be printed in at least one color by selectively using flexography, roto-gravure printing, heat-set printing, heat transfer printing, offset printing, offset lithography, non-contact laser printing, ink-jet printing, ultra-violet printing, hot-stamp printing, screen printing, silk-screen printing, or master batch printing.

The temperature display ink layer may be formed on part or whole of the top of the printing layer. The temperature display ink layer may be a reversible ink capable of changing to an original color.

The temperature display ink layer may have a color-changing temperature range of 60 to 100° C. and turn transparent in a color-changing temperature range.

The temperature display ink layer may be formed by at least one method selected from the group consisting of flexography, roto-gravure printing, heat-set printing, heat transfer printing, offset printing, offset lithography, non-contact laser printing, ink-jet printing, ultra-violet printing, hot-stamp printing, screen printing, silk-screen printing, and master batch printing.

In the present invention, there is also provided a packaging material using the printed material for temperature sensing display package.

Effects of the Invention

According to the present invention, the printed material for temperature sensing display package and the packaging material using the same enable it to realize a display in various colors in response to the change of high temperature using the printed material for packaging that includes a double-layer structure having a temperature display ink layer on a printing layer to increase the esthetic feature and promote the marketable quality of the product such as packaging materials or the like using the printed material.

BRIEF DESCRIPTIONS OF DRAWINGS

BEST MODES FOR CARRYING OUT THE INVENTION

Hereinafter, the construction and functions of the packaging material for temperature sensing display according to the present invention will be described in detail with reference to the accompanying drawings.

Figure 1A:
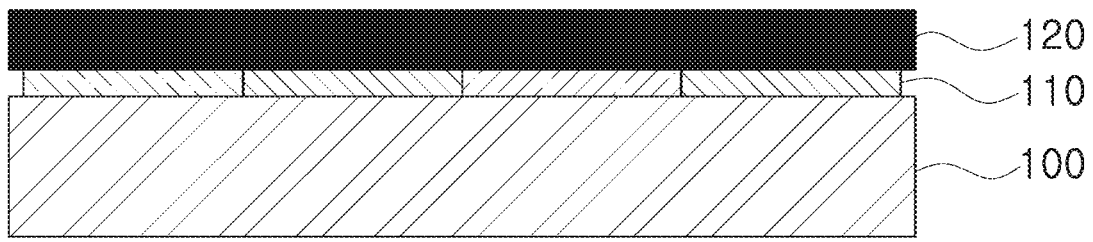
FIG. 1a is a partial cross-sectional view showing a printed material for temperature sensing display package in accordance with one embodiment of the present invention.
Figure 1B:
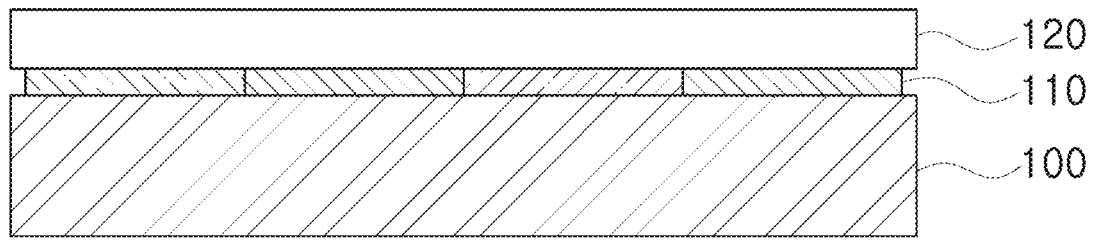
FIG. 1b is a partial cross-sectional view showing the printed material for package of FIG. 1a when heated.
Figure 2A:
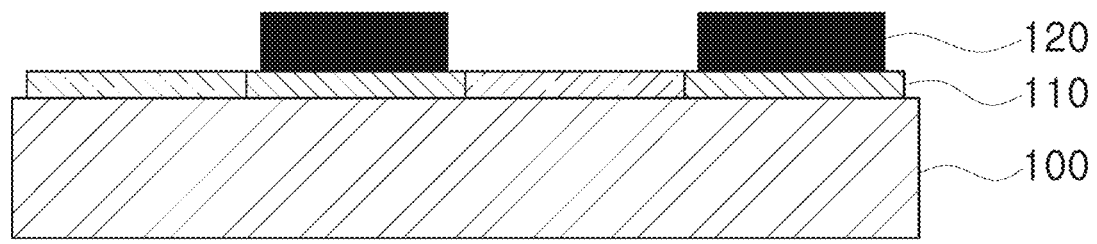
FIG. 2a is a partial cross-sectional view showing a printed material for temperature sensing display package in accordance with another embodiment of the present invention.
Figure 2B:
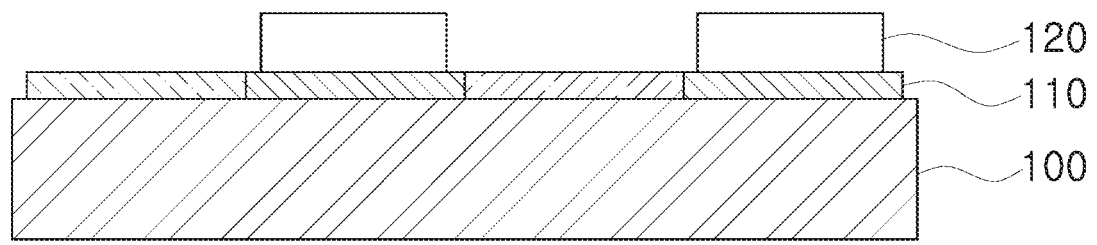
FIG. 2b is a partial cross-sectional view showing the printed material for package of FIG. 2a when heated.
Figure 3:
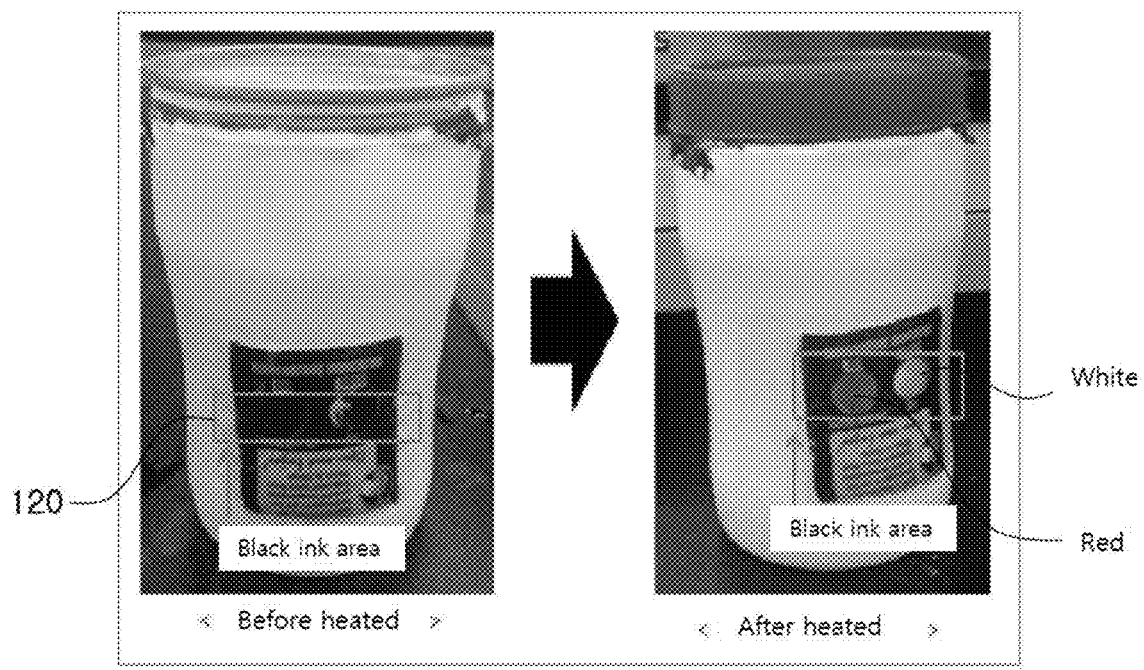
FIG. 3 is an image showing the use of a packaging material for temperature sensing display according to the present invention.

FIG. 1a is a partial cross-sectional view showing a printed material for temperature sensing display package in accordance with one embodiment of the present invention. FIG. 1b is a partial cross-sectional view showing the printed material for package of FIG. 1a when heated. FIG. 2a is a partial cross-sectional view showing a printed material for temperature sensing display package in accordance with another embodiment of the present invention. FIG. 2b is a partial cross-sectional view showing the printed material for package of FIG. 2a when heated. FIG. 3 is an image showing the use of a packaging material for temperature sensing display according to the present invention.

As shown in FIG. 1a, the printed material for temperature sensing display package according to the present invention includes a printed film 100, a printing layer 110, and a temperature display ink layer 120.

The printed film 100 is a film that can be attached directly to the surface of foods or other industrial products to display various characters or signs according to different methods such as in-mold or insert-mold techniques. If not shown, a plurality of layers may be formed on a base film to make the printed film 100 in two or more colors.

The printed film may be made of polypropylene (PP) commonly used in plastic containers, polyethylene (PE) used in drug containers due to its soft texture, polyethylene terephthalate (PET) used in beverage bottles, etc.

The printing layer 110 applied on the top of the printed film 100 is formed by printing images or characters in a defined design on the printed film 100.

The printing methods as used herein may include flexography, roto-gravure printing, heat-set printing, heat transfer printing, offset printing, offset lithography, non-contact laser printing, ink-jet printing, ultra-violet printing, hot-stamp printing, screen printing, silk-screen printing, and master batch printing. In the present invention, any one of the printing methods may be selected to form the printing layer 110.

In this regard, the printing layer 110 may be printed in at least one color using an ink of one color out of red, yellow, green, blue, etc., preferably in two or three colors or four colors for display in different colors.

The printing layer 110 may be printed with a general printing ink or a thermochromic ink. As shown in FIG. 2a, the temperature display ink layer 120 may be further formed on a part of the printing layer 110 formed with a printing ink or a thermochromic ink.

The printing ink, generally in wide use for printing, is a substance used to form images on a printed substrate with a hue and to transmit and express information with a combination of images.

And the thermochromic ink is an ink which functions to change the temperature by changing the color. The thermochromic ink could be an irreversible type that does not return original color even when the temperature returns to the original, or a reversible type does return original color when the temperature returns to the original, specifically reversible type could be used in the present invention, and, metal complex salt, cholesteric liquid crystal, metamocolor, 3 type of inks are generally used as the reversible type of the thermochromic ink And the temperature display ink layer 120 may be formed on the printing layer 110

The temperature display ink (or pigment) forming the temperature display ink layer is an ink substance similar to the thermochromic ink, but in the present invention, it is an ink changing color at a certain temperature. More specifically, the temperature display ink as used herein is a pigment that turns transparent at a certain high temperature and returns to the original color when the temperature goes down to a certain point or below. This type of ink is called "temperature display ink" in this specification, as it can be distinguished from the thermochromic ink.

The color-changing mechanism of the temperature display ink may be described as follows. The composition of the temperature display ink is made in the form of capsules including an organic acid, a leuco dye, and a high molecular weight (HMW) solvent. Once the temperature goes down to a certain point or below, the organic acid and the leuco dye turn to the solvent solid state, and the capsules containing the organic acid and the leuco dye interfere with the electrons and take a specific color. When exposed at a certain temperature or above, the organic acid and the leuco dye turn to the solvent liquid state to lose the color. More specifically, the color change occurs according to the optical change that proceeds in the order of crystal conversion, pH change, dehydration, pyrolysis, solid phase reaction, electron exchange in the electron-donor-specific receptor environment, and crystal structure change.

The composition of the temperature display ink may include the form of capsule including an organic acid, a leuco dye, and a high molecular weight (HMW) solvent. Examples of the organic acid may include, but are not limited to, at least one selected from the group consisting of bisphenol A, octyl or methyl p-hydroxybenzoate, 1,2,3-trizole, or 4-hydroxycoumarin derivatives. Examples of the leuco dye may include, but are not limited to, any known leuco dye, more specifically, ChromaZone, MATSUI or CTI leuco dyes. Examples of the high molecular weight (HMW) solvent may include, but are not limited to, at least one selected from the group consisting of alcohol, ester, ketone, or ether, more specifically, laurel or acetyl alcohol, butyl stearate, ketone, or ether.

Furthermore, the temperature display composition constituting the temperature display ink may use $Ag_2HgI_4$, $Cu_2HgI_4$, or a mixture of $Ag_2HgI_4$ and $Cu_2HgI_4$ at a predetermined ratio, which may be used alone or in combination with a pigment of a desired color. As the specific temperature point for color change is dependent upon the proportion of the pigment mixed with the temperature display composition, an appropriate combination of the pigment and the temperature display composition may induce a color change at a desired temperature.

The temperature display ink layer 120 may be formed by selectively using flexography, roto-gravure printing, heat-set printing, heat transfer printing, offset printing, offset lithography, non-contact laser printing, ink-jet printing, ultraviolet printing, hot-stamp printing, screen printing, silkscreen printing, or master batch printing.

Preferably, the temperature display ink layer 120 may be formed in a color of black or the like on part or whole of the top of the printing layer 110. The temperature display ink layer 120 may use a reversible ink capable of changing to an original color and have a color-changing temperature range of 60 to 100° C., more specifically 60 to 80° C.

The temperature display ink layer 120 may turn transparent in the color-changing temperature range. More specifically, when the temperature display ink layer 120 in black color is cooked with a device like a microwave, the wavelengths of the light emitted at about 60 to 100° C. make the black color disappear and the temperature display ink layer 120 turns transparent. As the temperature display ink layer 120 is transparent, the printing layer 110 in different colors becomes visible to display the status of the product.

Accordingly, in the packaging product that requires a display for high temperatures of 60° C. or above, the temperature display ink layer 120 is preferably applied to the whole surface of the printing layer 110, as shown in FIG. 1a. When a display for a temperature interval of 0 to 40° C. is required according to the characteristic of the packaging product, a printing ink or a thermochromic ink is applied to the printing layer 110 and a black-colored temperature display ink is applied only to a certain region that requires a display for the temperature interval of 60° C. or above, as shown in FIG. 2a.

Hereinafter, a description will be given as to the printing method for the printed material for temperature sensing display package according to the present invention.

In accordance with one embodiment of the present invention shown in FIG. 1a, general inks are used to print at least one color on the printed film 100 to form the printing layer 110.

For a display in different colors, the printing layer 110 is formed in three or four colors to print a defined design such as with images or characters that represent the characteristic of the product.

The temperature display ink layer 120 in black color having a predetermined thickness is formed on the top of the printing layer 110.

When the printed material is applied to a packaging material, the temperature display ink layer 120 turns transparent once cooked in a microwave or heated up to 60° C. or above, as shown in FIG. 1b, to make the printing layer 110 visible. As a result, the cooking status of the product or the like can be displayed through the printing layer 110 in different colors.

In accordance with another embodiment of the present invention shown in FIG. 2a, at least one color is printed on the printed film 100 to form the printing layer 110. The printing layer 110 is formed using general printing inks or thermochromic inks.

For a display in different colors, the printing layer 110 is formed in three or four colors to print a defined design such as with images or characters that represent the characteristic of the product.

The temperature display ink layer 120 in black color is formed on a part of the top of the printing layer 110.

When the printed material is applied to a packaging material, the printing layer 110 composed of a thermochromic ink shows a display in response to a temperature change in a temperature interval of 0 to 40° C. Once cooked in a microwave or heated up to 60° C. or above, the temperature display ink layer 120 turns transparent, as shown in FIG. 2b, to make the printing layer 110 visible, displaying the cooking status of the product or the like through the printing layer 110 in different colors.

When the temperature display ink layer 120 formed as shown in FIG. 3 is heated up, for example, it turns transparent to make the red- or white-colored parts of the printing layer 110 visible, so the cooking status of the product or the like can be displayed through the printing layer 110 in different colors.

As described above, the present invention involves applying the printing layer 110 on the printed film 100 using flexography, roto-gravure printing, offset printing, master batch printing, etc. and forming the temperature display ink layer 120 in a color of black or the like on the printing layer 110, so the temperature display ink layer 120, once cooked in a microwave or heated up to 60° C. or above, turns transparent to display different colors through the printing layer 110, thereby enhancing the marketable quality of the product.

The above-described present invention is not limited to the foregoing embodiments of the invention, and obviously many modifications and variations are possible without departing from the principles and the substantial scope of the present invention. The scope of the claims of the present invention includes such modifications and variations belonging to the principles of the present invention.

| [Index] | |
| --- | --- |
| 100: printed film. | 110: printing layer |
| 120: temperature display ink layer | |

What is claimed is:

1. A printed material for a temperature sensing display package, comprising:
    a printed film attached directly to a surface of a food product;
    a printing layer formed on the top of the printed film using a printing ink or a thermochromic ink; and
    a temperature display ink layer formed on the top of the printing layer,
    wherein the temperature display ink layer is black prior to heating the food product, and wherein the temperature display ink layer becomes transparent when the food product is heated to a temperature within a range of 60 to 100° C. in a microwave oven; and
    wherein the temperature display ink layer comprises a capsule including an organic acid, a leuco dye, and a high molecular weight (HMW) solvent.

2. The printed material for the temperature sensing display package as claimed in claim 1, wherein the printing layer is printed in at least one color by selectively using flexography, roto-gravure printing, heat-set printing, heat transfer printing, offset printing, offset lithography, non-contact laser printing, ink-jet printing, ultra-violet printing, hot-stamp printing, screen printing, silk-screen printing, or master batch printing.

3. The printed material for the temperature sensing display package as claimed in claim 1, wherein the temperature display ink layer is formed on part or whole of the top of the printing layer.

4. The printed material for the temperature sensing display package as claimed in claim 1, wherein the temperature display ink layer is a reversible ink capable of changing to an original color.

5. The printed material for the temperature sensing display package as claimed in claim 1, wherein the temperature display ink layer is formed by at least one method selected from the group consisting of flexography, roto-gravure printing, heat-set printing, heat transfer printing, offset printing, offset lithography, non-contact laser printing, ink-jet printing, ultra-violet printing, hot-stamp printing, screen printing, silk-screen printing, and master batch printing.

6. A packaging material comprising a printed material for a temperature sensing display package, said printed material comprising:
    a printed film attached directly to a surface of a food product;
    a printing layer formed on the top of the printed film using a printing ink or a thermochromic ink; and
    a temperature display ink layer formed on the top of the printing layer,
    wherein the temperature display ink layer is black prior to heating the food product, and wherein the temperature display ink layer becomes transparent when the food product is heated to a temperature within a range of 60 to 100° C. in a microwave oven; and
    wherein the temperature display ink layer comprises a capsule including an organic acid, a leuco dye, and a high molecular weight (HMW) solvent.

7. The packaging material of claim 6, wherein the printing layer is printed in at least one color by selectively using flexography, roto-gravure printing, heat-set printing, heat transfer printing, offset printing, offset lithography, non-contact laser printing, ink-jet printing, ultra-violet printing, hot-stamp printing, screen printing, silk-screen printing, or master batch printing.

8. The packaging material of claim 6, wherein the temperature display ink layer is formed on part or whole of the top of the printing layer.

9. The packaging material of claim 6, wherein the temperature display ink layer is a reversible ink capable of changing to an original color.

10. The packaging material of claim 6, wherein the temperature display ink layer is formed by at least one method selected from the group consisting of flexography, roto-gravure printing, heat-set printing, heat transfer printing, offset printing, offset lithography, non-contact laser printing, ink-jet printing, ultra-violet printing, hot-stamp printing, screen printing, silk-screen printing, and master batch printing.

* * * * *

UNITED STATES PATENT AND TRADEMARK OFFICE
CERTIFICATE OF CORRECTION

PATENT NO. : 10,900,845 B2
APPLICATION NO. : 15/769304
DATED : January 26, 2021
INVENTOR(S) : Eun Jin Park et al.

Page 1 of 1

It is certified that error appears in the above-identified patent and that said Letters Patent is hereby corrected as shown below:

On the Title Page

Column 1, Item (73):
Delete: "Assignee: CI Cheiljedang Corporation, Seoul (KR)"
Insert: --Assignee: CJ Cheiljedang Corporation, Seoul (KR)--

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*